(12) United States Patent
Yokota et al.

(10) Patent No.: US 11,256,246 B2
(45) Date of Patent: Feb. 22, 2022

(54) DATA GENERATING APPARATUS, DATA GENERATING METHOD, AND RECORDING MEDIUM

(71) Applicant: Yokogawa Electric Corporation, Musashino (JP)

(72) Inventors: Yusuke Yokota, Tokyo (JP); Ryouhei Furihata, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 168 days.

(21) Appl. No.: 16/686,692

(22) Filed: Nov. 18, 2019

(65) Prior Publication Data

US 2020/0166920 A1 May 28, 2020

(30) Foreign Application Priority Data

Nov. 22, 2018 (JP) .............................. JP2018-219604

(51) Int. Cl.
*G05B 23/02* (2006.01)
*G05B 19/408* (2006.01)
*G06Q 10/00* (2012.01)
*G06F 9/30* (2018.01)

(52) U.S. Cl.
CPC ....... *G05B 23/0283* (2013.01); *G05B 19/408* (2013.01); *G05B 23/0245* (2013.01); *G06F 9/3001* (2013.01); *G06Q 10/20* (2013.01)

(58) Field of Classification Search
CPC .............. G05B 19/408; G05B 23/0245; G05B 23/0283; G06F 9/3001; G06F 3/14; G06F 21/6245; G06Q 10/00; G06Q 10/20
USPC .......................................................... 702/34
See application file for complete search history.

(56) References Cited

U.S. PATENT DOCUMENTS

| 2003/0023758 | A1* | 1/2003 | Yoshikawa | G06F 3/14 |
| | | | | 709/247 |
| 2006/0179073 | A1* | 8/2006 | Kimura | G06F 21/6245 |
| 2017/0078520 | A1* | 3/2017 | Kobayashi | H04N 1/00307 |
| 2017/0345224 | A1 | 11/2017 | Itou | |

FOREIGN PATENT DOCUMENTS

| EP | 3223216 A1 | 9/2017 |
| JP | 2007-199748 A | 8/2007 |
| JP | 2016-099647 A | 5/2016 |
| JP | 2017-215746 A | 12/2017 |

\* cited by examiner

*Primary Examiner* — John H Le
(74) *Attorney, Agent, or Firm* — Westerman, Hattori, Daniels & Adrian, LLP

(57) ABSTRACT

A data generating apparatus according to the one aspect of the present invention may include a converter configured to acquire conversion information in which a conversion rule is defined for converting first data acquired by performing a maintenance operation into second data processable by a facility maintenance management system and to convert the first data in accordance with the conversion rule defined in the acquired conversion information to generate the second data.

18 Claims, 8 Drawing Sheets

FIG. 4

```
*** DB Information
Num of Database=2              :NUMBER OF PIECES OF ORIGINAL DATA         ⎫
DB1=INFORMATION A              :IDENTIFIER OF ORIGINAL DATA (NAME)        ⎪
DB2=INFORMATION B              :IDENTIFIER OF ORIGINAL DATA (NAME)        ⎬ IF1
Num of SQL=1                   :NUMBER OF PIECES OF SYSTEM DATA TO BE OUTPUT
Graph=No                       :PRESENCE/ABSENCE OF GRAPH DISPLAY         ⎭

*** Table1                     :ORIGINAL DATA 1 (INFORMATION A)           ⎫
DB=¥(FOLDER1)¥(FOLDER2)¥        :DATA ACCESS METHOD (STORAGE DESTINATION)  ⎪
Num of Field=4                 :NUMBER OF ELEMENTS                        ⎪
Direction=Horizontal           :DIRECTION OF ELEMENTS (Horizontal: HORIZONTAL DIRECTION)
Merge=No                       :NECESSITY/NON-NECESSITY OF MERGING        ⎬ IF21
*Element:                      :FOLLOWING IS SEPARATION ROW OF ELEMENT INFORMATION
Device Tag                     :NAME OF ELEMENT                           ⎪
Model                          :NAME OF ELEMENT                           ⎪
Serial No                      :NAME OF ELEMENT                           ⎪
Product Date:yyyy.mm.dd:yyyy/mm/dd :NAME OF ELEMENT/FORMAT CONVERSION INFORMATION
As Found CP* Error%:(Max)      :REARRANGEMENT INFORMATION AND ARITHMETIC OPERATION
                                INFORMATION OF ELEMENT                    ⎭   ⎫
                                                                              ⎬ IF2
*** Table2                     :ORIGINAL DATA 2 (INFORMATION B)           ⎫   ⎪
DB=¥(FOLDER3)¥(FOLDER4)¥        :DATA ACCESS METHOD (STORAGE DESTINATION)  ⎪
Num of Field=5                 :NUMBER OF ELEMENTS                        ⎪
Direction=Vertical             :DIRECTION OF ELEMENTS (Vertical: VERTICAL DIRECTION)
Merge=Yes                      :NECESSITY/NON-NECESSITY OF MERGING        ⎬ IF22
*Element:                      :FOLLOWING IS SEPARATION ROW OF ELEMENT INFORMATION
Device Tag=                    :NAME OF ELEMENT                           ⎪
ProtocolType=                  :NAME OF ELEMENT                           ⎪
CommunicationType=             :NAME OF ELEMENT                           ⎪
DeviceID=                      :NAME OF ELEMENT                           ⎪
VendorName=                    :NAME OF ELEMENT                           ⎭

*** SQL1                                        :SYSTEM DATA              ⎫
Num of SQLLine=5                                :NUMBER OF ELEMENTS       ⎪
SELECT                                                                    ⎪
 [INFORMATION A].[TAG] as [TAG],                :ELEMENT INFORMATION AND NAME CHANGE
 [INFORMATION B].[DATE1] as [DATE],             :ELEMENT INFORMATION AND NAME CHANGE
 [INFORMATION A].[A] as [A],                    :ELEMENT INFORMATION AND NAME CHANGE
 [INFORMATION B].[B] as [B],                    :ELEMENT INFORMATION AND NAME CHANGE
 [INFORMATION B].[C] as [C]                     :ELEMENT INFORMATION AND NAME CHANGE  ⎬ IF3
FROM                                                                      ⎪
 ([INFORMATION A] INNER JOIN [INFORMATION B]                              ⎪
 ON ([INFORMATION A].[TAG]=[INFORMATION B].[TAG]                          ⎪
    AND [INFORMATION A].[DATE1]=[INFORMATION B].[DATE2])) :COMBINATION INFORMATION OF ELEMENTS
WHERE                                                                     ⎪
 ([INFORMATION A].[ DATE1]>=#2018/01/01#)       :EXTRACTION INFORMATION OF ELEMENTS   ⎭
```

DATA GENERATING APPARATUS, DATA GENERATING METHOD, AND RECORDING MEDIUM

BACKGROUND OF THE INVENTION

Field of the Invention

The present invention relates to a data generating apparatus, a data generating method, and a recording medium.

The present application claims priority based on Japanese patent application 2018-219604, filed on Nov. 22, 2018 and includes herein by reference the content thereof.

Description of Related Art

In a plant, a factory, and the like (hereinafter, in a case in which these are collectively referred to, one will be referred to as a "plant"), a distributed control system (DCS) has been built, and a high-level automatic operation is realized. This distribution control system is a control system in which a controller controlling field equipment (measurement devices and actuators) called field devices is arranged in a distributed manner for every several control loops. In a plant in which such a distributed control system is built, maintenance of field devices performed by a worker is performed regularly or irregularly in view of preventing abnormal operations, maintaining measurement accuracy, and the like.

In many cases, the maintenance of field devices is performed using a device maintenance apparatus that can perform wired communication or wireless communication with the field devices. This device maintenance apparatus, for example, is a laptop or tablet computer, a personal digital assistant (PDA), a handheld terminal (HHT), a smartphone, or the like in which a dedicated program for performing maintenance of field devices is installed. By using such a device maintenance apparatus, for example, various maintenance operations corresponding to field devices that are maintenance targets such as a checking operation of reading and checking device information set in the field devices that are maintenance targets or the like, a setting operation of setting new device information in the field devices that are maintenance targets, and the like are performed. In addition to the maintenance of field devices, maintenance of devices such as facilities installed in the plant is also performed. For example, a worker visually checks corrosion states of piping and the like, performs ranking (digitalizing) associated with the corrosion states, and performs an operation of inputting the rankings to a holding device maintenance apparatus as data.

When the maintenance operation using the device maintenance apparatus described above ends, an operation of generating a report using the device maintenance apparatus is performed. This report is a collection of operation results of maintenance operations and, for example, is presented to a facility manager managing facilities of a plant. Details of the presented report, for example, are input to a facility maintenance management system (computerized maintenance management system (CMMS)) and are used for management of facilities, management of execution periods of maintenance operations, and the like. In Japanese Unexamined Patent Application, First Publication No. 2017-215746, a device maintenance apparatus that can generate a report including device information of field devices acquired by maintenance operations, maintenance information relating to maintenance of field devices, operation histories for field devices, and the like in an arbitrary layout is disclosed.

SUMMARY OF THE INVENTION

A maintenance operation using a conventional facility maintenance management system, as described above, is limited to the management of facilities, management of execution periods of maintenance operations, and the like, and data that is required is also limited. However, in recent years, in order to respond to various requests, implementation of multiple functions and diversification of a facility maintenance management system has been achieved, and situations in which required data is different for each facility maintenance management system have also occurred. In such a situation, a structure that can easily generate data required for each facility maintenance management system is necessary.

One aspect of the present invention provides a data generating apparatus, a data generating method, and a recording medium capable of easily generating data required for individual facility maintenance management systems.

A data generating apparatus according to the one aspect of the present invention may include a converter configured to acquire conversion information in which a conversion rule is defined for converting first data acquired by performing a maintenance operation into second data processable by a facility maintenance management system and to convert the first data in accordance with the conversion rule defined in the acquired conversion information to generate the second data.

According to one aspect of the present invention, there is an effect of being capable of easily generating data required for individual facility maintenance management systems.

BRIEF DESCRIPTION OF THE DRAWINGS

FIG. 4 is a specific example of conversion information according to one embodiment of the present invention.

DETAILED DESCRIPTION OF THE INVENTION

Hereinafter, a data generating apparatus, a data generating method, and a recording medium according to one embodiment of the present invention will be described in detail with reference to the drawings.

<Data Generating Apparatus>

Figure 1:
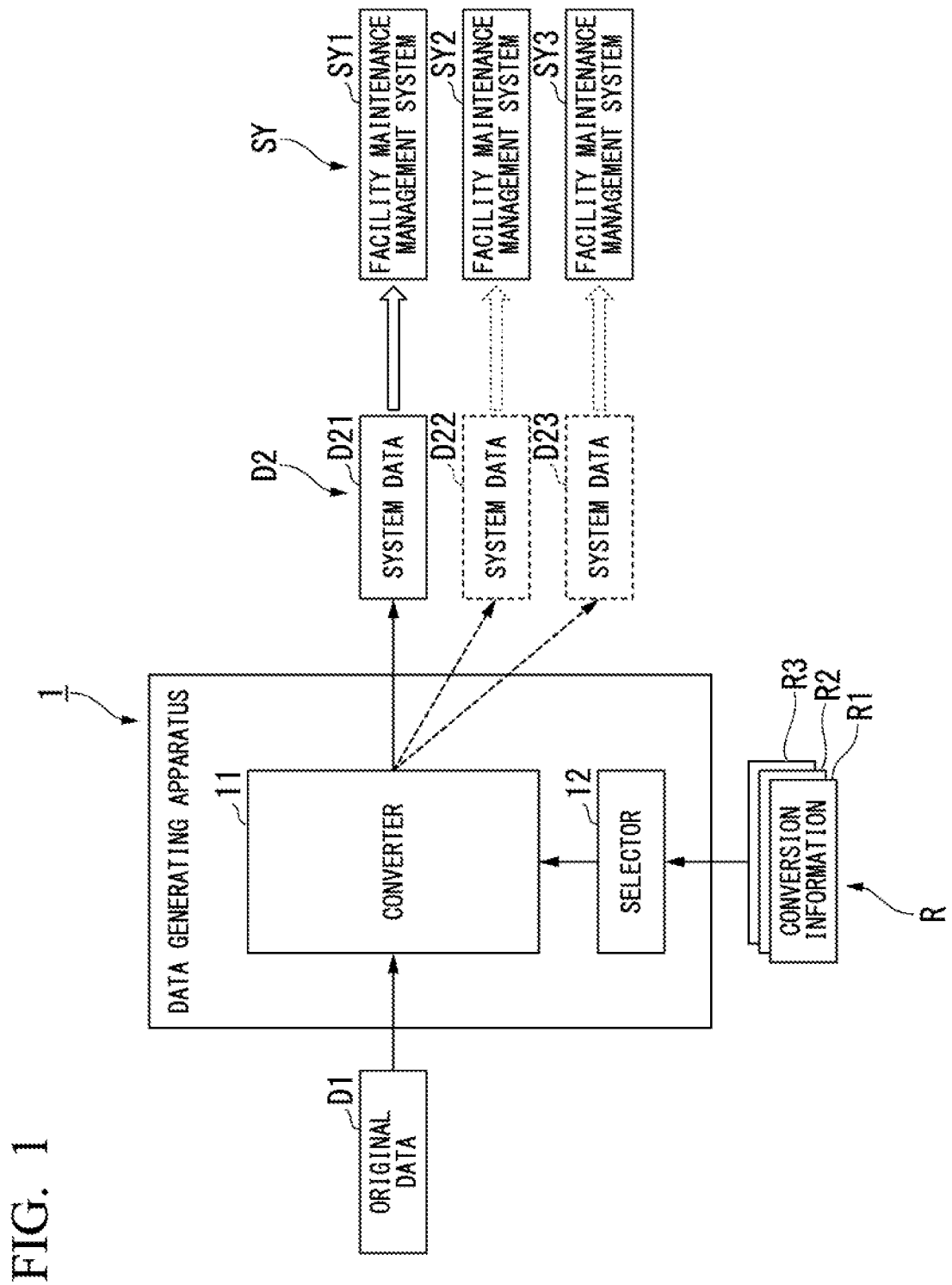
FIG. 1 is a block diagram showing a main part configuration of a data generating apparatus according to one embodiment of the present invention.

FIG. 1 is a block diagram showing a main part configuration of a data generating apparatus according to one embodiment of the present invention. As shown in FIG. 1, the data generating apparatus 1 according to this embodiment includes a converter 11 (conversion means) and a selector 12 and generates system data D2 (second data) by converting original data D1 (first data) in accordance with conversion information R.

The original data D1 is data acquired by performing a maintenance operation. For example, the original data D1 is data representing operation results of maintenance operations performed using a device maintenance apparatus not shown in the drawing for devices (including devices such as field devices, facilities, and the like) configuring a distributed control system that is built in a plant. In FIG. 1, for easy understanding, only one piece of original data D1 is shown. The original data D1 may be either a plurality of pieces of original data D1 of the same type or a plurality of pieces of original data D1 of different types.

The system data D2 is data used by a facility maintenance management system SY. Implementation of multiple functions and versification of the facility maintenance management system SY has progressed, and data that is required (data that can be processed) may be different for each facility maintenance management system. For example, even when certain system data can be processed by a certain facility maintenance management system, there are cases in which the system data cannot be processed by a different facility maintenance management system. For example, the facility maintenance management system SY may be configured using one computer or may have a configuration in which a plurality of computers are connected through a network.

In FIG. 1, for easy understanding, three facility maintenance management systems SY1, SY2, and SY3 are shown as the facility maintenance management systems SY described above. Three pieces of system data D21, D22, and D23 are shown as the system data D2 descried above in FIG. 1. It is assumed that the facility maintenance management system SY1 can process the system data D21, the facility maintenance management system SY2 can process the system data D22, and the facility maintenance management system SY3 can process the system data D23.

The conversion information R is information in which a conversion rule for converting original data D1 acquired by performing a maintenance operation into the system data D2 that can be processed by the facility maintenance management system SY is defined. This conversion information R is prepared for each facility maintenance management system SY. Conversion information R1 shown in FIG. 1 is prepared for generating system data D21 that can be processed by the facility maintenance management system SY1. Conversion information R2 is prepared for generating system data D22 that can be processed by the facility maintenance management system SY2. Conversion information R3 is prepared for generating system data D23 that can be processed by the facility maintenance management system SY3.

More specifically, information (first information) for identifying original data D1 and system data D2 relating to a conversion, information (second information) representing a data structure of the original data D1 relating to the conversion, and information (third information) for defining a process for generating the system data D2 from the original data D1 relating to the conversion are included in the conversion information R. While representative information included in the conversion information R will be described here, information other than the information described here may be included.

For example, the following information is included in the information (the first information) for identifying the original data D1 and the system data D2 relating to the conversion described above.

Number of pieces of the original data D1 relating to the conversion

Identifier (name) of the original data D1 relating to the conversion

Number of pieces of the system data D2 to be output

Presence/absence of a graph included in the system data D2

For example, the following information is included in the information (the second information) representing the data structure of the original data D1 relating to the conversion described above. In a case in which there are a plurality of pieces of original data D1, the following information is defined for each of the pieces of the original data D1.

Method of accessing the original data (storage destination)

Number of elements included in the original data

Direction of elements included in the original data (a vertical direction or a horizontal direction)

Presence/absence of necessity of merging (integrating) the original data

Information of an arithmetic operation performed for the original data

Information of a format conversion of the original data

Rearrangement information of elements of the original data

For example, the following information is included in the information (the third information) defining the process for generating the system data D2 from the original data D1 relating to the conversion.

Number of elements

Combination information of elements

Rearrangement information of elements

Arithmetic operation information of elements

Names of elements (change of element names from the original data)

Extraction information of elements

The converter 11 acquires conversion information R and generates system data D2 by converting the original data D1 in accordance with a conversion rule defined in the acquired conversion information R. More specifically, the converter 11 generates system data D2 by converting the original data D1 in accordance with a conversion rule defined in the conversion information R selected by the selector 12. The converter 11 performs at least one process among the following processes in accordance with the conversion rule defined in the conversion information R.

Process of performing rearrangement of the original data D1 (a first process)

Process of performing merging or combining of the original data D1 (a second process)

Process of extracting specific data from the original data D1 (a third process)

Process of performing an arithmetic operation using the original data D1 (a fourth process)

Process of generating a table, a graph, or text using the original data D1 (a fifth process)

As described above, the original data D1 is data acquired by performing a maintenance operation, and accordingly, identification information used for identifying a device that is a maintenance target is included in the original data D1. This identification information, for example, is device information (a device ID), which is uniquely set, assigned to each field device installed in a plant in advance, tag information set for each field device, or the like. The converter 11 performs a conversion of the original data D1 by referring to such identification information. By referring to the identification information, a specific device to which each piece of information of a plurality of devices included in the original data D1 corresponds can be easily identified, and accordingly, the conversion of the original data D1 can be easily performed. Details of the process performed by the converter 11 will be described later.

The selector 12 selects one piece of conversion information R from among a plurality of pieces of conversion information R prepared for a plurality of facility maintenance management systems SY. For example, the selector 12 selects one piece of conversion information R on the basis of a user's instruction. More specifically, in a case in which system data D21 that can be processed by the facility maintenance management system SY1 is generated, the selector 12 selects conversion information R1. In a case in which system data D22 that can be processed by the facility maintenance management system SY2 is generated, the selector 12 selects conversion information R2. In a case in which system data D23 that can be processed by the facility maintenance management system SY3 is generated, the selector 12 selects conversion information R3.

In this way, the data generating apparatus 1 according to this embodiment prepares the conversion information R1 to R3 for generating the system data D21 to D23 that can be processed respectively by the facility maintenance management systems SY1 to SY3 in advance. By changing the conversion information R1 to R3 to be selected without changing the configuration of the data generating apparatus 1, the system data D21 to D23 that can be processed respectively by the facility maintenance management systems SY1 to SY3 can be generated. Accordingly, compared to a case in which a dedicated data generating apparatus is prepared for each of the facility maintenance management systems SY1 to SY3, the system data D21 to D23 respectively required by the facility maintenance management systems SY1 to SY3 can be more easily generated.

<Data Generating Method>

Figure 2:
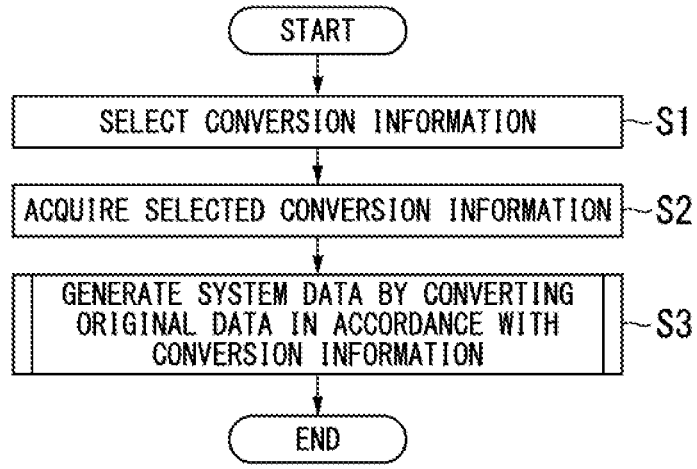
FIG. 2 is a flowchart showing an overview of a data generating method according to one embodiment of the present invention.

FIG. 2 is a flowchart showing an overview of a data generating method according to one embodiment of the present invention. For example, the process of the flowchart shown in FIG. 2 is started by a user of the data generating apparatus 1 performing a conversion start instruction. When the process is started, first, a process of selecting conversion information is performed by the selector 12 (Step S1). For example, the process of selecting one piece of conversion information in accordance with a user's instruction from among pieces of the conversion information R1 to R3 is performed.

Next, a process of acquiring conversion information selected by the selector 12 is performed by the converter 11 (Step S2: acquisition step). By performing this process, the conversion information selected by the selector 12 is read (acquired) by the converter 11. When the process described above ends, a process of generating system data by converting the original data in accordance with the acquired conversion information is performed by the converter 11 (Step S3: conversion step).

For example, in a case in which the conversion information R1 is selected by the selector 12, a process of generating system data D21 that can be processed by the facility maintenance management system SY1 by converting the original data D1 in accordance with the conversion information R1 is performed. In a case in which the conversion information R2 is selected by the selector 12, a process of generating system data D22 that can be processed by the facility maintenance management system SY2 by converting the original data D1 in accordance with the conversion information R2 is performed. Similarly, in a case in which the conversion information R3 is selected by the selector 12, a process of generating system data D23 that can be processed by the facility maintenance management system SY3 by converting the original data D1 in accordance with the conversion information R3 is performed.

Figure 3:
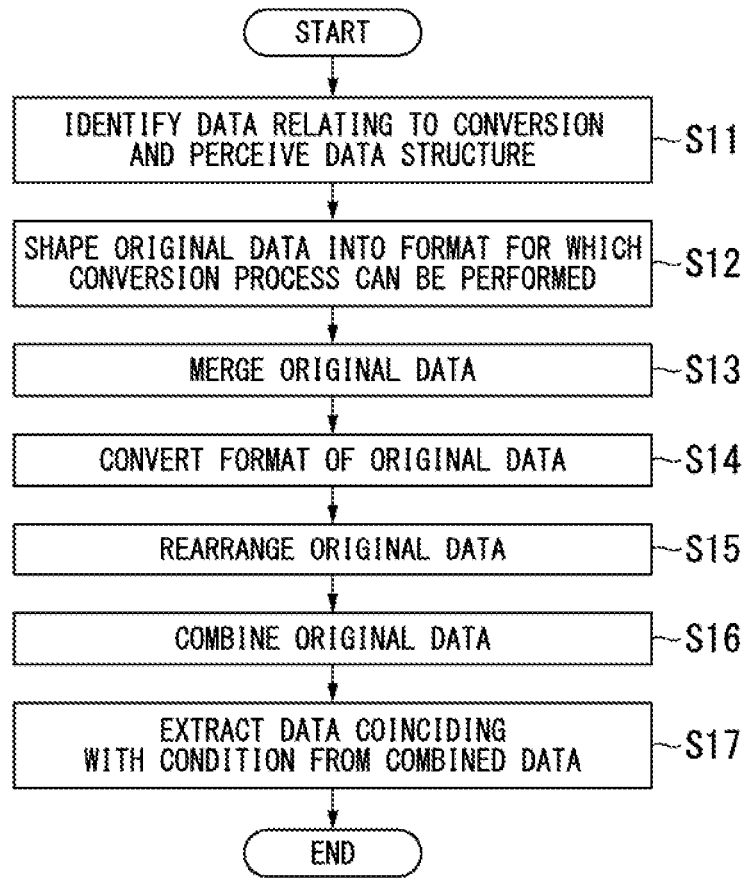
FIG. 3 is a flowchart showing one example of a process performed in Step S3 shown in FIG. 2.
Figure 5:
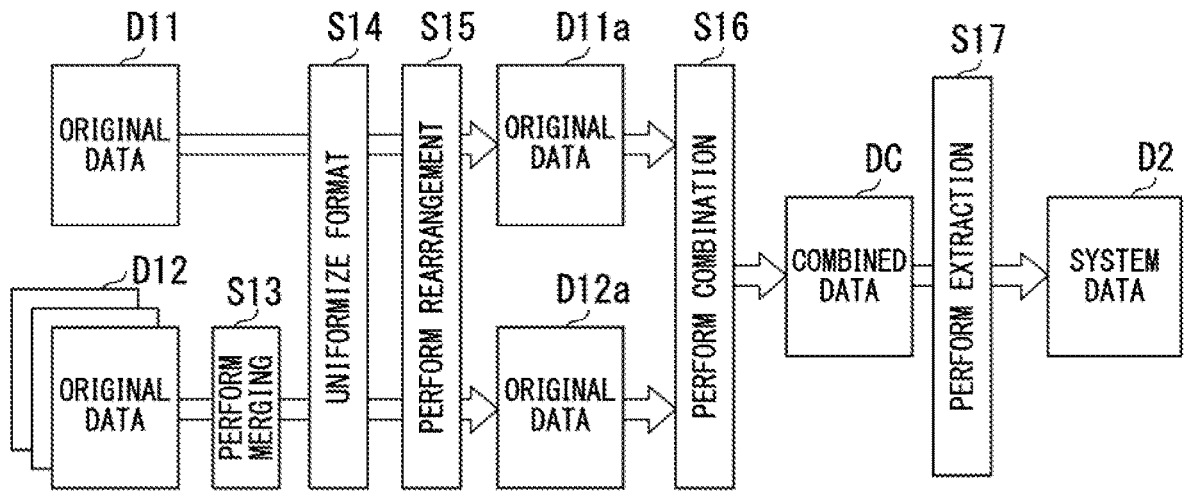
FIG. 5 is a diagram showing one example of a specific flow of a process performed according to one embodiment of the present invention.

FIG. 3 is a flowchart showing one example of a process performed in Step S3 shown in FIG. 2. Hereinafter, for easy understanding, a case in which conversion information shown in FIG. 4 is acquired by the converter 11, and system data D2 is generated from two types of original data D11 and D12 in accordance with a flow shown in FIG. 5 will be described as an example. FIG. 4 is a specific example of conversion information according to one embodiment of the present invention. FIG. 5 is a diagram showing one example of a specific flow of a process performed according to one embodiment of the present invention. In FIG. 5, the same reference signs are assigned to processes corresponding to the processes shown in FIG. 4.

Before the process of the flowchart shown in FIG. 3 is described, the conversion information shown in FIG. 4 will be described briefly. The conversion information shown in FIG. 4 is largely divided into three pieces of information IF1 to IF3. The information IF1 is information (first information) used for identifying original data and system data relating to a conversion. The information IF2 is information (second information) representing a data structure of original data relating to a conversion. Here, as shown in FIG. 5, since a case in which the system data D2 is generated from the two types of original data D11 and D12 is considered, information IF21 for the original data D11 and information IF22 for the original data D12 are included in the information IF2. The information IF3 is information (third information) that defines a process for generating the system data D2 from the original data D11 and D12 relating to a conversion.

The conversion information, for example, as shown in FIG. 4 is described using SQL in a text format. Basically, the information to be given to the converter 11 is described from the start of each row. The information to be given to the converter 11 may be appropriately indented in consideration of visibility. In order to allow the information to be given to the converter 11 to be easily perceived, a comment may be described in each row. A comment may be described after a punctuation mark ":". The conversion information is not limited to being described in a text format but may be described in a binary format.

When the process of the flowchart shown in FIG. 3 is started, first, together with identifying data relating to a conversion, a process of perceiving a data structure of the identified data is performed by the converter 11 (Step S11). More specifically, a process of identifying original data D11 relating to a conversion, original data D12 relating to a conversion, and system data D2 relating to a conversion and perceiving the data structures of the identified original data D11 and D12 is performed by the converter 11.

More specifically, on the basis of the information IF1 included in the conversion information shown in FIG. 4, it is identified that the number of pieces of original data relating to a conversion is "2" from the description "Num of Database=2," and it is identified that the original data (original data D11 and D12) relating to the conversion is information A and information B from the descriptions "DB1=information A" and "DB2=information B." It is identified that the number of pieces of system data D2 to be output is "1" from the description "Num of SQL=1," and it is identified that no graph is generated for the system data D2 to be output from the description "Graph=No."

Data structures of the original data D11 and D12 are perceived on the basis of the information IF2 included in the conversion information shown in FIG. 4. More specifically, the data structure of the original data D11 is perceived from the information IF21 included in the information IF2, and the data structure of the original data D12 is perceived from the information IF22 included in the information IF2.

For example, for the original data D11, a storage destination of the original data D11 is identified from the description "DB=\(FOLDER1)(FOLDER2)," it is perceived that the number of elements included in the original data D11 is "4" from the description "Num of Field=4" and that the arrangement direction of elements included in the original data D11 is a horizontal direction from the description "Direction=Horizontal," and an indication that merging is not necessary is perceived for the original data D11 from the description "Merge=No." The reason that merging is not necessary for the original data D11 is that only one piece of the original data D11 is prepared as shown in FIG. 5.

For example, for the original data D12, a storage destination of the original data D12 is identified from the description "DB=\(FOLDER3)(FOLDER4)," it is perceived that the number of elements included in the original data D12 is "5" from the description "Num of Field=5" and that the arrangement direction of elements included in the original data D12 is a vertical direction from the description "Direction=Vertical," and an indication that merging is necessary is perceived for the original data D12 from the description "Merge=Yes." The reason that merging is necessary for the original data D12 is that a plurality of pieces of original data D12 are prepared as shown in FIG. 5.

Next, a process of shaping original data into a form for which a conversion process can be performed is performed by the converter 11 (Step S12). For example, a process of configuring the arrangement directions of elements included in the original data D11 and D12 to be the same is performed by the converter 11. Thereafter, a process of merging the original data is performed (Step S13). For example, a process of arranging (merging) a plurality of pieces of prepared original data D12 into one is performed. Since only one piece of original data D11 is prepared, the merging of the original data D11 is not performed.

Figure 6A:
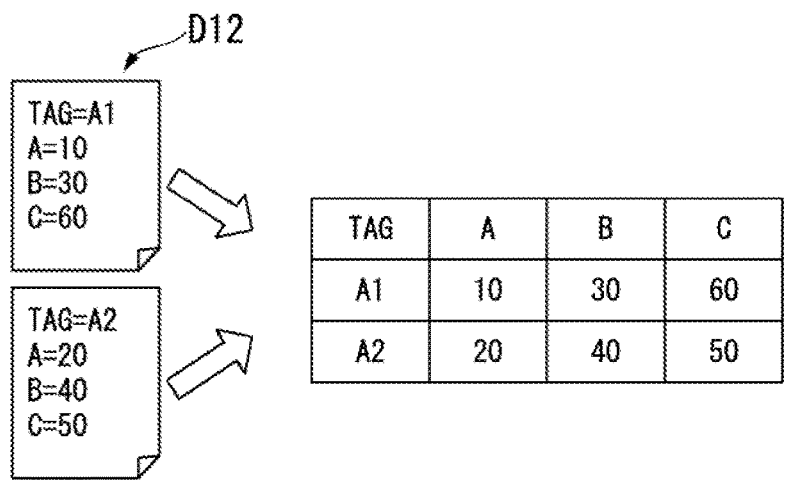
FIG. 6A is a diagram showing one example of a process performed in Steps S12 and S13 shown in FIG. 3.
Figure 6B:
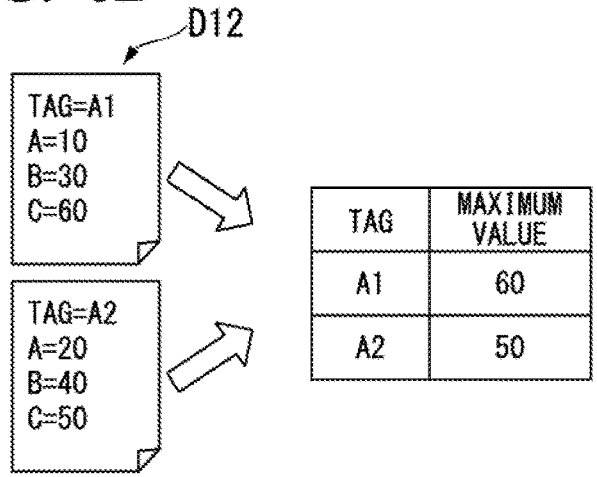
FIG. 6B is a diagram showing one example of a process performed in Steps S12 and S13 shown in FIG. 3.

Each of FIGS. 6A and 6B is a diagram showing one example of a process performed in Steps S12 and S13 shown in FIG. 3. As described above, the original data D11 is one piece of data in which the arrangement direction of elements is the horizontal direction, and the original data D12 is a plurality of pieces of data in which the arrangement direction of elements is the vertical direction. For this reason, in Steps S12 and S13 shown in FIG. 3, for example, a process of changing the arrangement direction of elements of the original data D12 to the horizontal direction to be arranged as one is performed.

For example, as shown in FIG. 6A, a case in which original data D12 to which a tag "A1" is attached and original data D12 to which a tag "A2" is attached are prepared will be considered. In the original data D12 to which the tag "A1" is attached, elements "A=10," "B=30," and "C=60" of which the arrangement direction is the vertical direction are included. In addition, in the original data D12 to which the tag "A2" is attached, elements "A=20," "B=40," and "C=50" of which the arrangement direction is the vertical direction are included.

By performing the process of Step S12 shown in FIG. 3, the arrangement directions of the elements included in the original data D12 to which the tag "A1" is attached and the elements included in the original data D12 to which the tag "A2" is attached are changed to the horizontal direction. Then, by performing the process of Step S13 shown in FIGS. 3 and 5, as shown in FIG. 6A, the original data D12 to which the tag "A1" is attached and the original data D12 to which the tag "A2" is attached of which the arrangement directions of elements are changed to the horizontal direction are arranged as one piece of data.

In a case in which the process of Step S13 is performed, instead of simply arranging a plurality of pieces of original data D12 as one piece, after a certain process (for example, an arithmetic operation process or an extraction process) is performed, the plurality of pieces of data may be arranged as one piece of data. For example, as shown in FIG. 6B, after acquiring a maximum value of the elements included in the original data D12 to which the tag "A1" is attached and acquiring a maximum value of the elements included in the original data D12 to which the tag "A2" is attached, the data may be arranged as one piece of data. In order to cause the converter 11 to perform such an arithmetic operation, for example, the following equation may be additionally written in the information IF22 shown in FIG. 4.

"MAX(A, B, C) as maximum value"

Subsequently, a process of converting the format of the original data is performed by the converter 11 (Step S14). For example, a process of uniformizing formats of dates included in the original data D11 and D12 is performed. Referring to FIG. 4, the description "Product Date: yyyymm.dd:yyyy/mm/dd" is included in the information IF21. For this reason, in the process of Step S14 shown in FIGS. 3 and 5, for example, a process of converting the format of a date included in the original data D11 from "year.month.date" to "year/month/date" in which each of the year and the date is denoted using two digits is performed.

Figure 7A:
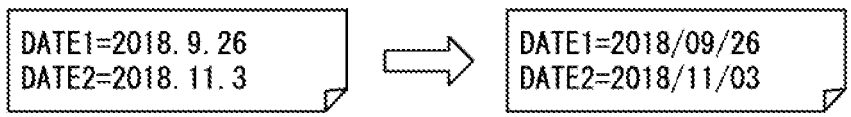
FIG. 7A is a diagram showing one example of a process performed in Step S14 shown in FIGS. 3 and 5.
Figure 7B:
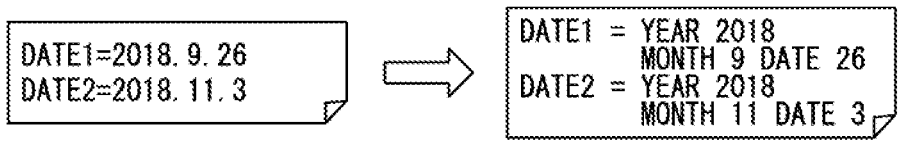
FIG. 7B is a diagram showing one example of a process performed in Step S14 shown in FIGS. 3 and 5.

Each of FIGS. 7A and 7B is a diagram showing one example of a process performed in Step S14 shown in FIGS. 3 and 5. For example, as shown in FIG. 7A, a date "DATE1" is converted from the denotation "2018.9.26" to the denotation "2018/09/26," and a date "DATE2" is converted from the denotation "2018.11.3" to the denotation "2018/11/03."

As shown in FIG. 7B, "year," "month," and "date" may be set as separators, and a conversion into a date not changing the number of digits can be performed. For example, a date "DATE1" is converted from the denotation "2018.9.26" to the denotation "year 2018 month 9 data 26," and a date "DATE2" is converted from the denotation "2018.11.3" to the denotation "year 2018 month 11 date 3." In order to perform such a conversion, the description "Product Date:yyyy.mm.dd:yyyy/mm/dd" included in the information IF21 may be changed as below.

"Product Date:yyyy.mm.dd:yyyy year m month d date"

Although an example in which the format of a date is converted has been described here, a target of which the format is to be converted is not limited to a date, and a format of an arbitrary target can be changed. For example, other than a date, the format of a decimal point may be converted. Since there are many cases in which the format of a date or a decimal point is different for each country, it is extremely important to perform such a conversion for easily generating data required by each facility maintenance management system.

Subsequently, a process of performing rearrangement of original data is performed by the converter 11 (Step S15). This process, for example, is a process including a process similar to the shaping process performed in Step S12 shown in FIG. 3. In a case in which the rearrangement of original data is not necessary, the process of Step S15 is omitted. When the process described above ends, as shown in FIG. 5, the original data D11 is converted into original data D11a, and a plurality of pieces of original data D12 are converted into original data D12a. The processes of Steps S12 to S15 are not essentially necessary. Among the processes of Steps S12 to S15, only arbitrary processes that are necessary in accordance with the original data D11 and D12 may be performed.

Subsequently, a process of combining original data is performed by the converter 11 (Step S16). More specifically, a process of combining the original data D11a and the original data D12a acquired in the process described above to be arranged as one piece of combination data DC is performed by the converter 11. When the process described above ends, a process of generating system data D2 by extracting data coinciding with a condition from the combination data is performed by the converter 11 (Step S17).

Figure 8A:
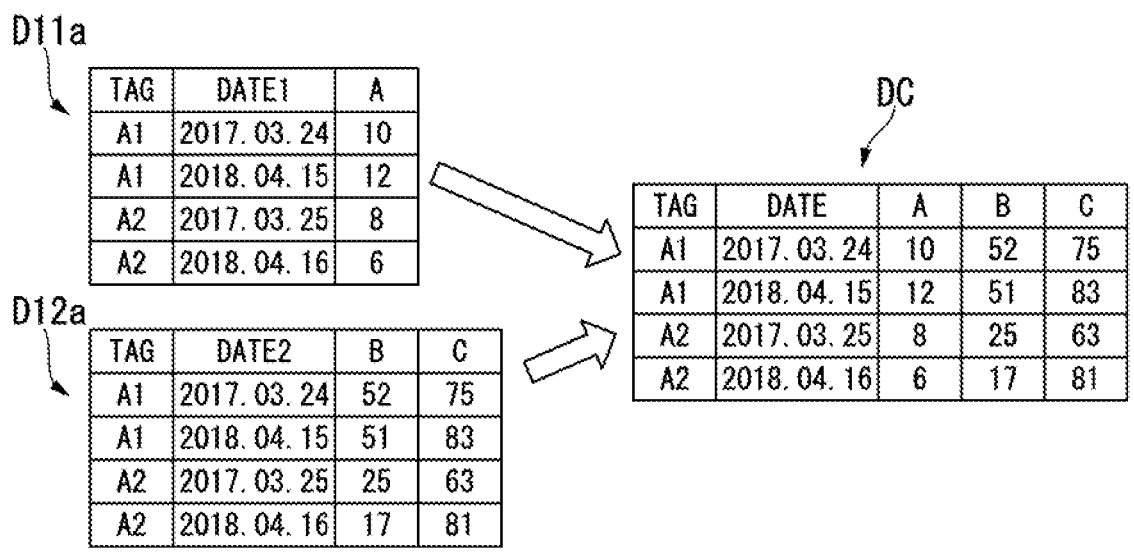
FIG. 8A is a diagram showing processes performed in Steps S16 and S17 shown in FIGS. 3 and 5.
Figure 8B:
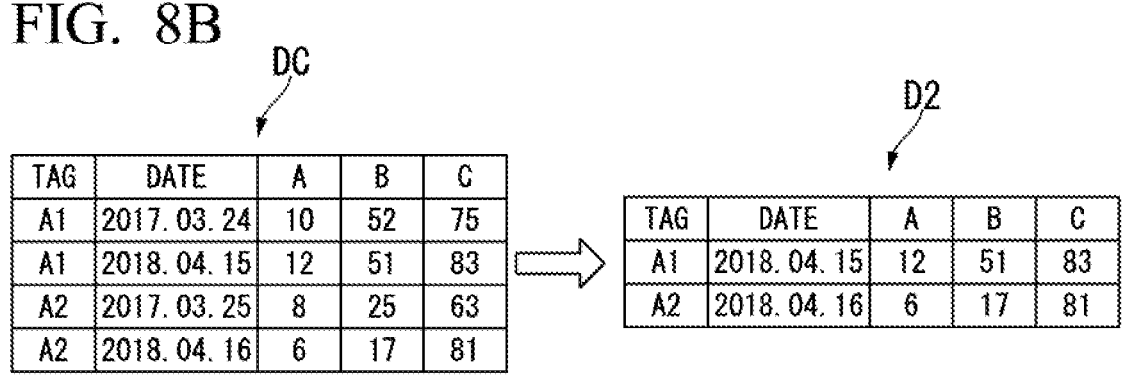
FIG. 8B is a diagram showing processes performed in Steps S16 and S17 shown in FIGS. 3 and 5.

Each of FIGS. 8A and 8B is a diagram showing processes performed in Steps S16 and S17 shown in FIGS. 3 and 5. In Step S16 shown in FIGS. 3 and 5, a process of combining the original data D11a and the original data D12a to be arranged as one piece of combination data DC on the basis of the following information included in the information IF3 shown in FIG. 4 is performed by the converter 11.

As shown in FIG. 8A, the original data D11a is data having four records in which a tag TAG, a date DATE1, and one element A are stored. The original data D12a is data having four records in which a tag TAG, a date DATE2, and two elements B and C are stored. A tag and a date stored in four records of the original data D11a and a tag and a date stored in four records of the original data D12a are assumed to be the same.

By performing the process of Step S16 shown in FIGS. 3 and 5, records in which a tag TAG of the original data D11a and a tag TAG of the original data D12a coincide with each other, and a date DATE1 of the original data D11a and a date DATE2 of the original data D12a coincide with each other are combined, and combination data DC shown in FIG. 8A is acquired. This combination data DC is data having four records in which a tag and a data common to the original data D11a and the original data D12a and one element A included in the original data D11a and two elements B and C included in the original data D12a are stored. In this way, the original data D11a and the original data D12a are combined.

In Step S17 shown in FIGS. 3 and 5, a process of generating system data D2 by extracting necessary information from the combination data DC on the basis of the following information included in the information IF3 shown in FIG. 4 is performed by the converter 11. An extraction condition defined in the following information represents extracting only data equal to or later than the year 2018 from the combination data DC.

WHERE ([INFORMATION A]. [DATE1]>=#201801/01 #)

By performing the process of Step S17 shown in FIGS. 3 and 5, data coinciding with the extraction condition described above is extracted from the combination data DC shown in FIG. 8B, whereby system data D2 is generated. In FIG. 8B, the generated system data D2 is formed only from records of which dates are equal to or later than the year 2018 among four records included in the combination data DC.

In this way, the process of generating the system data D2 by extracting necessary information from the combination data DC is performed. With this, the series of processes shown in FIG. 3 ends. Although an example in which the process of Step S17 is performed after the process of Step S16 ends is described here for easy understanding, the processes of Steps S16 and S17 may be performed as a series of processes. The combination data DC acquired in the process of Step S16 may be set as system data D2 without performing the process of Step S17. Data acquired by performing extraction of Step S17 for the original data D11a may be set as system data D2 without performing the process of Step S16.

```
SELECT
    [INFORMATION A].[TAG] as [TAG]
    [INFORMATION B].[DATE1] as [DATE]
    [INFORMATION A].[A] as [A]
    [INFORMATION B].[B] as [B]
    [INFORMATION B].[C] as [C]
  FROM
    ([INFORMATION A] INNER JOIN [INFORMATION B]
    ON ([INFORMATION A].[TAG] = [INFORMATION B].[TAG] AND
[INFORMATION A].[DATE1] = [INFORMATION B].[DATE2]))
```

The process of the flowchart shown in FIG. 3 is merely one example. Depending on details of data (the original data D1 and the system data D2) relating to a conversion, a process different from the processes of the flowchart shown in FIG. 3 may be performed. For example, the order of the processes shown in FIG. 3 may be changed, some of the processes shown in FIG. 3 may be omitted, or a process other than the processes shown in FIG. 3 may be added.

Figure 9:
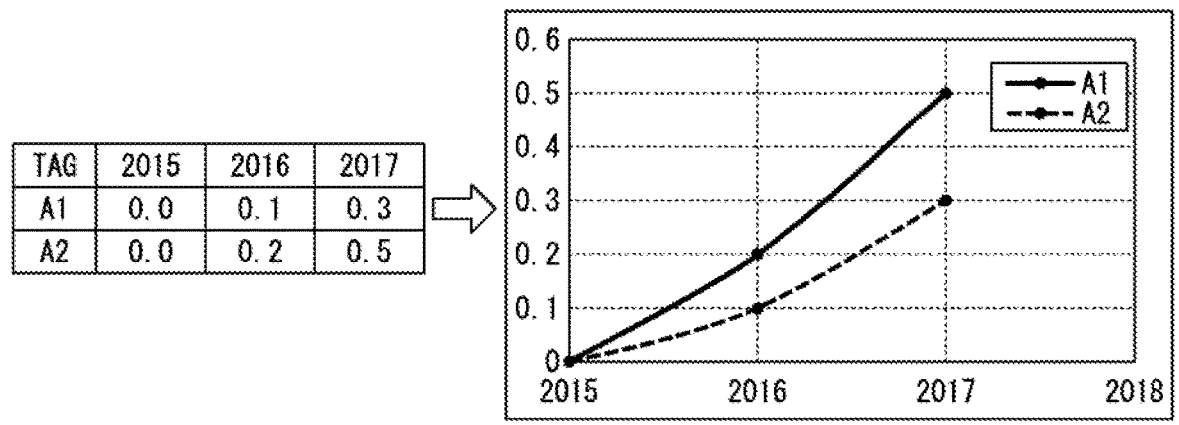
FIG. 9 is a diagram showing a graph generating process according to one embodiment of the present invention.

FIG. 9 is a diagram showing a graph generating process according to one embodiment of the present invention. As shown in FIG. 9, data in which measured values of years (2015, 2016, and 2017) are associated with tags is included in the original data. When the graph generating process is performed by the converter 11, a two-dimensional graph representing changes in a measured value with respect to time for each tag is generated on the basis of this original data. The generated two-dimensional graph is a graph having a year as its horizontal axis and a measured value as its vertical axis. This original data may be data for which at least any one of the shaping process of Step S12, the merging process of Step S13, the format converting process of Step S14, the rearrangement process of Step S15, the combining process of Step S16, and the extraction process of Step S17 has been executed.

Generation of the graphs shown in FIG. 9 is performed, for example, in a case in which there is a description of "Graph=YES" (it represents that generation of graphs is performed for the system data D2) in the information IF1 shown in FIG. 4, and the following details are described in the conversion information.

**GRAPH
ITEM=2: Number of series 2
ItemField=TAG: TAG is set as series
Vertical=Value: Value is used for vertical axis
Horizontal=Field: Filed (in this case, 2015, 2016, and 2017) is used for horizontal axis Although an example in which graphs are generated from original data has been described, objects to be generated from the original data are not limited to graphs. For example, tables may be generated from original data, or specific characteristics or figures may be generated. Alternatively, moving images may be generated from the original data. Furthermore, objects not only visually expressed but also appealing to the ear (for example, sounds or the like) may be generated from the original data.

MOUNTING EXAMPLE OF DATA
GENERATING APPARATUS

First Mounting Example

Figure 10:
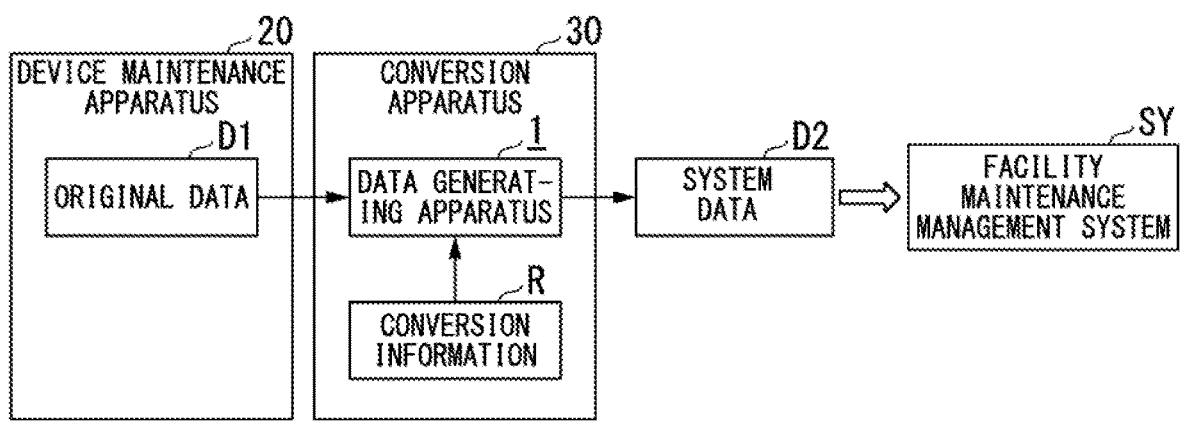
FIG. 10 is a block diagram showing a first mounting example of a data generating apparatus according to one embodiment of the present invention.
Figure 11:
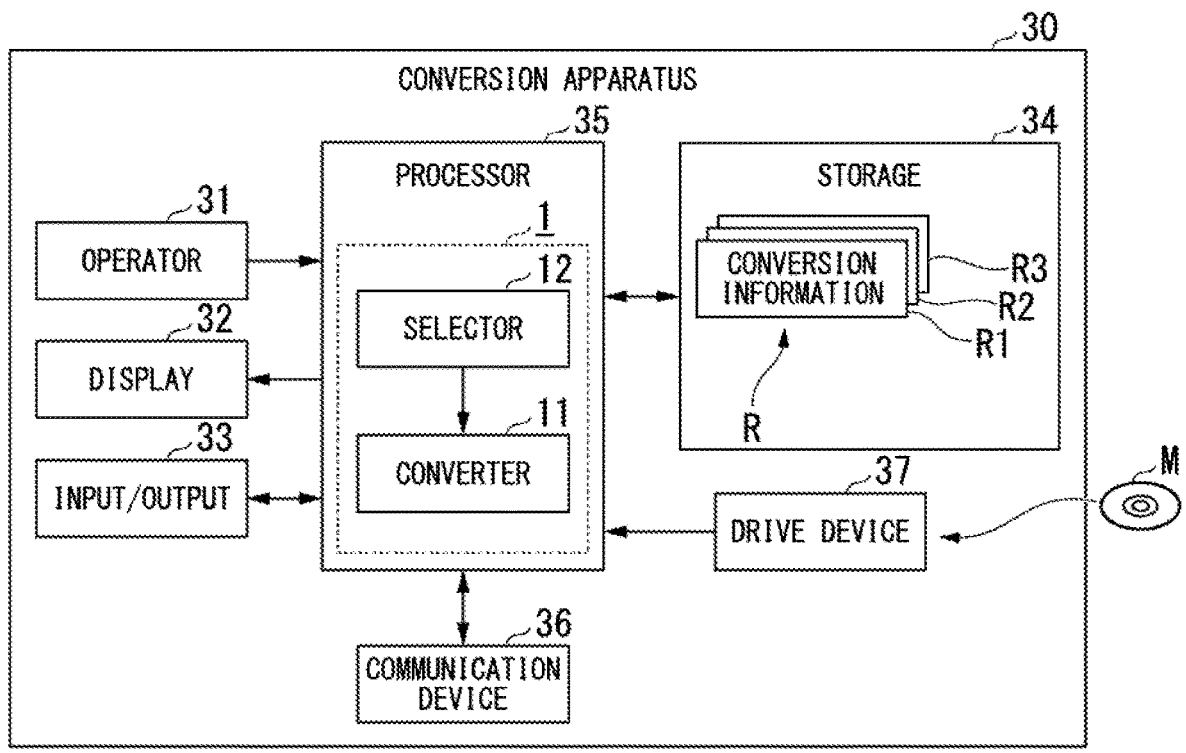
FIG. 11 is a block diagram showing a main part configuration of a conversion apparatus according to the first mounting example.

FIG. 10 is a block diagram showing a first mounting example of a data generating apparatus according to one embodiment of the present invention. This mounting example is an example in which the data generating apparatus 1 shown in FIG. 1 is disposed in the conversion apparatus 30. The conversion apparatus 30 is a device that converts original data D1 output from a device maintenance apparatus 20 into system data D2 that can be processed by a facility maintenance management system SY using the conversion information R and outputs the system data. This conversion apparatus 30, for example, is disposed inside a plant. The device maintenance apparatus 20 is a device that is used when maintenance of field devices is performed FIG. 11 is a block diagram showing a main part configuration of the conversion apparatus according to the first mounting example. As shown in FIG. 11, the conversion apparatus 30 includes an operator 31, a display 32, an input/output 33 (output), a storage 34, a processor 35, a communication device 36 (transmitter), and a drive device 37. Such a conversion apparatus 30, for example, is realized by a laptop computer, a desktop computer, or the like. Although details will be described later, the function of the conversion apparatus 30 (the function of converting the original data D1 into the system data D2) is realized by software by reading and installing a program recorded on a recording medium M. Alternatively, the function is realized by software by installing a program downloaded through a network not shown in the drawing.

The operator 31, for example, includes an input device such as a keyboard or a pointing device and outputs an instruction (an instruction for the conversion apparatus 30) according to an operation of a user using the conversion apparatus 30 to the processor 35. The display 32, for example, includes a display device such as a liquid crystal display device and displays various kinds of information output from the processor 35. The operator 31 and the display 32 may be physically separate from each other or may be physically integrated such as a touch panel-type liquid crystal display device having both a display function and an operation function.

The input/output 33 performs input/output of various kinds of information under the control of the processor 35. For example, the input/output 33 may input and output various kinds of information by communicating with an external device (for example, the device maintenance apparatus 20) or may input and output various kinds of information by reading or writing various kinds of information for a recording medium that can be loaded or unloaded (for example, a nonvolatile memory). The communication performed with an external device may be either wired communication or wireless communication.

The storage 34, for example, includes an auxiliary storage device such as a hard disk drive (HDD) or a solid state drive (SSD) and stores various kinds of information. For example, the storage 34 stores conversion information R (R1 to R3) used for a conversion of the original data D1. The storage 34 stores the original data D1 output from the device maintenance apparatus 20 and the system data D2 generated by the processor 25. Although not shown in FIG. 11, various programs, for example, executed by the conversion apparatus 30 are also stored in the storage 34.

The processor 35 performs various processes on the basis of an instruction from the operator 31. The processor 35 outputs results of various processes to the display 32, the input/output 33, or the communication device 36 or stores the results in the storage 34. The converter 11 and the selector 12 that are major components of the data generating apparatus 1 are disposed in this processor 35. A function implemented in the processor 35 is realized by a program used for realizing the function being executed by hardware such as a central processor (CPU). In other words, the functions of the converter 11 and the selector 12 are realized by software and hardware resources in cooperation.

The communication device 36, for example, performs communication through a network not shown in the drawing under the control of the processor 35. The communication device 36 may perform either wired communication or wireless communication. The drive device 37, for example, reads data recorded on a computer-readable recording medium M such as a CD-ROM or a DVD (registered trademark)-ROM. This recording medium M stores a program realizing the function of each of the blocks (the converter 11 and the selector 12) of the data generating apparatus 1.

In a state in which the device maintenance apparatus 20 and the conversion apparatus 30 are communicatively connected, for example, when a user gives an instruction for transmitting original data D1 to the device maintenance apparatus 20, the original data D1 is transmitted from the device maintenance apparatus 20 to the conversion apparatus 30. The original data D1 transmitted from the device maintenance apparatus 20 is input to the input/output 33 or the communication device 36 of the conversion apparatus 30 and is stored in the storage 34 through the processor 35.

A user gives an instruction for identifying original data D1 that is a conversion target in the original data D1 stored in the storage 34 by operating the operator 31 of the conversion apparatus 30. The original data D1 to be identified here may be one pieces of data, a plurality of pieces of data of the same type, or a plurality of pieces of data of different types. A user gives an instruction for identifying conversion information R used at the time of converting the original data D1 by operating the operator 31.

After the operation described above is performed, when a user gives an instruction for starting a conversion by operating the operator 31, a process of generating system data D2 by converting the original data D1 identified using the identified conversion information R is performed. This process has been described with reference to FIGS. 3 to 9 and the like, and thus, description will be omitted here. The generated system data D2, for example, is stored in the storage 34.

When a user gives an instruction for outputting the system data D2 stored in the storage 34 by operating the operator 31, the system data D2 is read from the storage 34 to the processor 35 and, for example, is output from the input/output 33 to a recording medium that can be loaded or unloaded. A transmission destination of the system data D2 (for example, the facility maintenance management system SY) may be defined in advance, and the system data D2 may be transmitted from the communication device 36 to the transmission destination when the system data D2 is generated. The system data D2 can be input to the facility maintenance management system SY by at least any one of the input/output 33 and the communication device 36.

In this mounting example, the conversion apparatus 30 including the data generating apparatus 1 is arranged, and the conversion apparatus 30 is caused to read the original data D1 acquired by the device maintenance apparatus 20 and converts the original data into system data D2. For this reason, in this mounting example, for example, the conversion apparatus 30 may be caused to read the original data D1 acquired by a plurality of device maintenance apparatuses 20, and the read original data may be converted into system data D2 together. The conversion apparatus 30 may store conversion information R and install in a plant or the like and may be used as a standalone-type device that can be connected to the device maintenance apparatus 20.

Second Mounting Example

Figure 12:
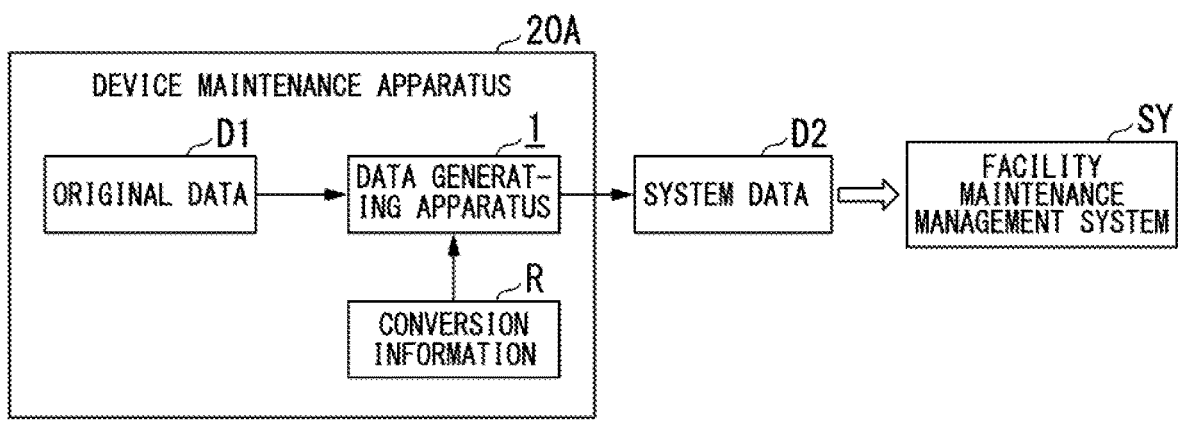
FIG. 12 is a block diagram showing a second mounting example of a data generating apparatus according to one embodiment of the present invention.

FIG. 12 is a block diagram showing a second mounting example of a data generating apparatus according to one embodiment of the present invention. This mounting example is an example in which the data generating apparatus 1 shown in FIG. 1 is disposed in a device maintenance apparatus. A device maintenance apparatus 20A shown in FIG. 12, so to speak, has a configuration in which the data generating apparatus 1 shown in FIG. 1 is added to the device maintenance apparatus 20 shown in FIG. 10. The device maintenance apparatus 20A converts original data D1 acquired by performing a maintenance operation into system data D2 in advance and outputs or transmits the acquired system data D2.

Figure 13:
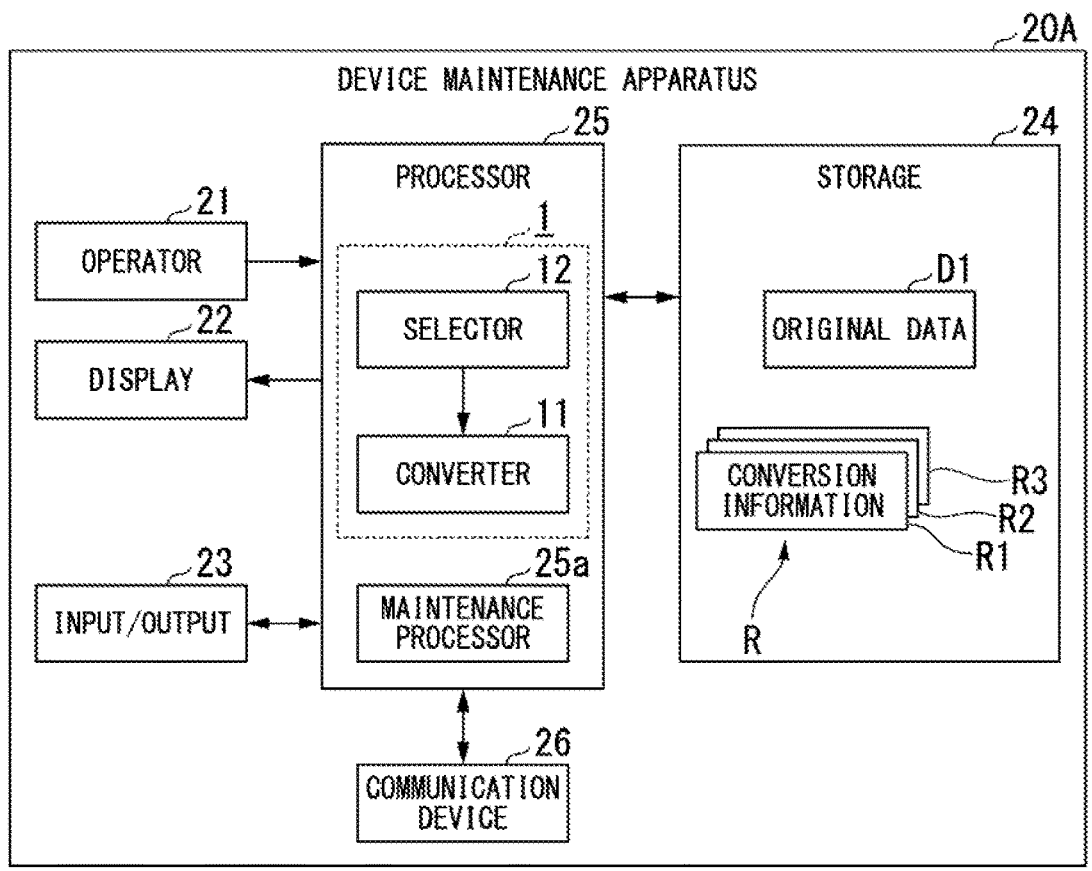
FIG. 13 is a block diagram showing a main part configuration of a device maintenance apparatus according to the second mounting example.

FIG. 13 is a block diagram showing a main part configuration of a device maintenance apparatus according to the second mounting example. As shown in FIG. 13, the device maintenance apparatus 20A includes an operator 21, a display 22, an input/output 23 (output), a storage 24, a processor 25, and a communication device 26 (transmitter). Such a device maintenance apparatus 20A, for example, is realized by a laptop computer, a tablet computer, or the like. In addition, the functions of the device maintenance apparatus 20A (the function of converting original data D1 into system data D2 and the like) are realized by software by reading and installing a program (for example, a program recorded on the same recording medium as the recording medium M shown in FIG. 11). Alternatively, the functions are realized by software by installing a program downloaded through a network not shown in the drawing.

The operator 21, the display 22, the input/output 23, and the communication device 26 are respectively similar to the operator 31, the display 32, the input/output 33, and the communication device 36 shown in FIG. 11, and thus description thereof will be omitted here. The storage 24 stores original data D1 and conversion information R (R1 to R3) used for converting the original data D1, and the like. The storage 24 may store system data D2 generated by the processor 25. For example, various programs executed by the device maintenance apparatus 20A are also stored in the storage 24.

The processor 25 performs various processes on the basis of an instruction from the operator 21 and outputs results thereof to the display 22, the input/output 23, or the communication device 26 or stores the results in the storage 24. A maintenance processor 25a and the converter 11 and the selector 12 that are major components of the data generating apparatus 1 are disposed in this processor 25. The maintenance processor 25a performs processes that are necessary for performing maintenance of field devices. For example, the processes are a process of communicating with a field device, a process of reading information set in a field device, a process of setting new information in a field device, and a calibration process, an adjustment process, a test process, and the like for a field device.

A function implemented in the processor 25 is realized by a program used for realizing the function being executed by hardware such as a central processor (CPU). In other words, the functions of the converter 11, the selector 12, and the maintenance processor 25a are realized by software and hardware resources in cooperation.

A user gives an instruction for identifying original data D1 that is a conversion target in original data D1 stored in the storage 24 by operating the operator 21 of the device maintenance apparatus 20A. A user gives an instruction for identifying conversion information R used at the time of converting the original data D1 by operating the operator 21. After the operation described above is performed, when a user gives an instruction for starting a conversion by operating the operator 21, a process of generating system data D2 by converting the original data D1 identified using the identified conversion information R is performed. The generated system data D2, for example, is stored in the storage 24.

When a user gives an instruction for outputting system data D2 stored in the storage 24 by operating the operator 21, the system data D2 is read from the storage 24 into the processor 25 and, for example, is output from the input/output 23 to a recording medium that can be loaded or unloaded. A transmission destination of the system data D2 (for example, the facility maintenance management system SY) may be defined in advance, and the system data D2 may be transmitted from the communication device 26 to the transmission destination when the system data D2 is generated. The system data D2 can be input to the facility maintenance management system SY by using at least any one of the input/output 23 and the communication device 26.

In this mounting example, the data generating apparatus 1 is disposed in the device maintenance apparatus 20A in advance, and, before original data D1 acquired by the device maintenance apparatus 20A is output or transmitted from the device maintenance apparatus 20A, the original data D1 is converted into the system data D2 in advance. For this reason, in this mounting example, for example, the system data D2 acquired by the device maintenance apparatus 20A can be directly output from the device maintenance apparatus 20A to the facility maintenance management system SY. In this mounting example, a device (the conversion apparatus 30 shown in FIG. 10) other than the device maintenance apparatus 20A may not be arranged. For this reason, in a plant or the like, a user can convert data into system data D2 and output or transmit the system data in a simplified manner by carrying only the device maintenance apparatus 20A.

Third Mounting Example

Figure 14:
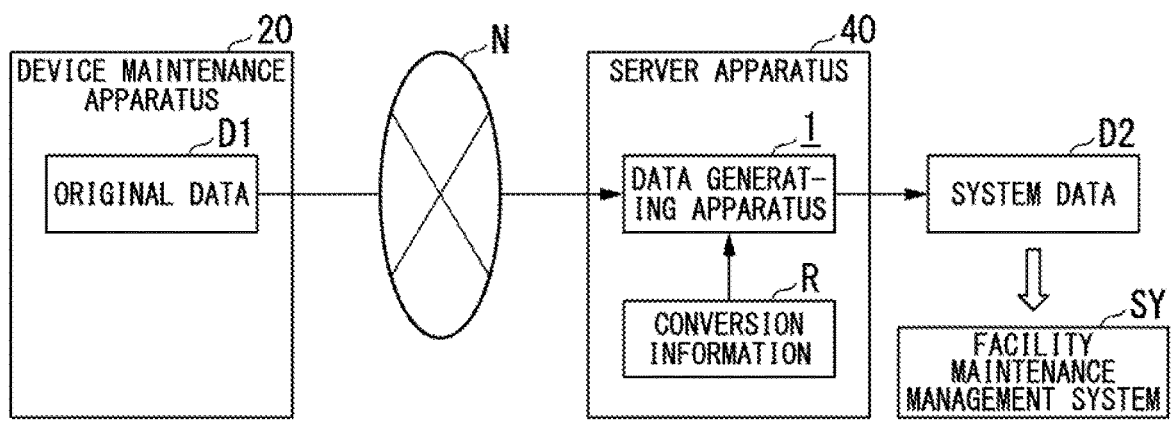
FIG. 14 is a block diagram showing a third mounting example of a data generating apparatus according to one embodiment of the present invention.

FIG. 14 is a block diagram showing a third mounting example of a data generating apparatus according to one embodiment of the present invention. This mounting example is an example in which the data generating apparatus 1 shown in FIG. 1 is arranged in a server apparatus 40 connected to a network. This mounting example, so to speak, can be regarded as a configuration in which the conversion apparatus 30 shown in FIG. 10 is connected to a network N as a server apparatus 40. There is only a difference between this mounting example and the first mounting example whether or not the transmission of the original data D1 and the like are performed through the network N, and the operations are similar to each other, and thus detailed description thereof will be omitted.

In this mounting example, a server apparatus 40 including the data generating apparatus 1 is arranged, and original data D1 acquired by the device maintenance apparatus 20 is transmitted to the server apparatus 40 through the network N and is converted into system data D2 by the server apparatus 40. For this reason, in this mounting example, similar to the first mounting example, for example, by causing the server apparatus 40 to read original data D1 acquired by a plurality of device maintenance apparatuses 20, the original data can also be converted into system data D2 together. In this mounting example, for example, since the conversion apparatus 30 shown in FIG. 10 does not need to be disposed inside a plant, for example, maintenance information acquired from a plurality of plants can be also managed together.

As described above, in this embodiment, the converter 11 of the data generating apparatus 1 acquires conversion information R in which a conversion rule for converting original data D1 acquired by performing a maintenance operation into system data D2 that can be processed by the facility maintenance management system SY is defined. Then, the converter 11 of the data generating apparatus 1 generates system data D2 by converting the original data D1 in accordance with the conversion rule defined in the acquired conversion information R.

The conversion information R (R1 to R3) described above is prepared for each of a plurality of facility maintenance management systems SY1 to SY3, and, by selecting one of pieces of the conversion information R1 to R3, one of pieces of the system data D21 to D23 to be generated can be generated. For this reason, by only changing the conversion information R1 to R3 to be selected without changing the configuration of the data generating apparatus 1, system data D21 to D23 that is required by each of the facility maintenance management systems SY1 to SY3 can be easily generated.

As above, although the data generating apparatus, the data generating method, and the recording medium according to one embodiment of the present invention have been described, the present invention is not limited to the embodiment described above and thus can be freely changed within the scope of the present invention. For example, the mounting examples of the data generating apparatus are not limited to the first to third mounting examples described above. For example, the data generating apparatus may be mounted in an apparatus that can directly output information such as a printer or an apparatus providing analysis results of information.

Although the recording median M having a disc shape is shown in FIG. 11, the recording medium M is not limited to a disc shape. A "computer-readable recording mediman" is a storage device such as a writable nonvolatile memory such as a flexible disc, a magneto-optical disc, a ROM, or a flash memory, a portable medium such as a CD-ROM, a hard disk built in a computer system, or the like.

For example, the server apparatus 40 shown in FIG. 14 may be realized using cloud computing.

What is claimed is:

1. A data generating apparatus comprising:
   a converter configured to acquire conversion information in which a conversion rule is defined for converting first data acquired by performing a maintenance operation into second data processable by a facility maintenance management system and to convert the first data in accordance with the conversion rule defined in the acquired conversion information to generate the second data,
   wherein the converter is configured to perform a first process of integrating or combining the first data in accordance with the conversion rule defined in the conversion information,
   wherein the first data comprises first original data and second original data, types of the first original data and second original data being different from each other, and
   wherein the converter is configured to perform the first process of combining records in which a tag of the first original data and a tag of the second original data coincide with each other to generate combination data.

2. The data generating apparatus according to claim 1, further comprising:
   a selector configured to select one piece of conversion information from among a plurality of pieces of conversion information prepared for a plurality of facility maintenance management systems.

3. The data generating apparatus according to claim 1, wherein the converter is configured to further perform at least one process of a second process of performing rearrangement of the first data, a third process of extracting specific data from the first data, a fourth process of performing an arithmetic operation using the first data, or a fifth process of generating a table, a graph, or text using the first data in accordance with the conversion rule defined in the conversion information.

4. The data generating apparatus according to claim 1, wherein the converter is configured to further perform a second process of performing rearrangement of the first data in accordance with the conversion rule defined in the conversion information.

5. The data generating apparatus according to claim 1, wherein the converter is configured to further perform a third process of extracting specific data from the first data in accordance with the conversion rule defined in the conversion information.

6. The data generating apparatus according to claim 1, wherein the converter is configured to further perform a fourth process of performing an arithmetic operation using the first data in accordance with the conversion rule defined in the conversion information.

7. The data generating apparatus according to claim 1, wherein the converter is configured to further perform a fifth process of generating a table, a graph, or text using the first data in accordance with the conversion rule defined in the conversion information.

8. The data generating apparatus according to claim 1, wherein the converter is configured to further perform a second process of performing rearrangement of the first data, a third process of extracting specific data from the first data, a fourth process of performing an arithmetic operation using the first data, and a fifth process of generating a table, a graph, or text using the first data in accordance with the conversion rule defined in the conversion information.

9. The data generating apparatus according to claim 1, wherein the conversion information comprises first information for identifying the first data and the second data relating to a conversion, second information representing a data structure of the first data relating to the conversion, and third information defining a process for generating the second data from the first data relating to the conversion.

10. The data generating apparatus according to claim 1, wherein the first data comprises identification information for identifying a device that is a maintenance target, and
wherein the converter is configured to convert the first data with referring to the identification information.

11. The data generating apparatus according to claim 1, further comprising:
an output configured to output the second data generated by the converter.

12. The data generating apparatus according to claim 1, further comprising:
a transmitter configured to transmit the second data generated by the converter to a transmission destination defined in advance.

13. The data generating apparatus according to claim 1, wherein the converter is configured to perform the first process of changing an arrangement direction of elements included in a plurality of pieces of first data and arranging the plurality of pieces of first data as one piece of data.

14. The data generating apparatus according to claim 1, wherein the converter is configured to perform the first process of changing an arrangement direction of elements included in a plurality of pieces of first data, performing an arithmetic operation process or an extraction process to with respect to the plurality of pieces of first data, and arranging the plurality of pieces of first data as one piece of data.

15. The data generating apparatus according to claim 1, wherein the converter is configured to perform a process of converting a format of the first data.

16. The data generating apparatus according to claim 1, wherein the converter is configured to extract information defined in advance from the combination data to generate the second data.

17. A data generating method comprising:
acquiring conversion information in which a conversion rule is defined for converting first data acquired by performing a maintenance operation into second data processable by a facility maintenance management system; and
converting the first data in accordance with the conversion rule defined in the acquired conversion information to generate the second data,
wherein the converting of the first data comprises performing a first process of integrating or combining the first data in accordance with the conversion rule defined in the conversion information,
wherein the first data comprises first original data and second original data, types of the first original data and second original data being different from each other, and
wherein the converting of the first data comprises performing the first process of combining records in which a tag of the first original data and a tag of the second original data coincide with each other to generate combination data.

18. A non-transitory computer-readable recording medium storing a data generating program causing a computer to perform:
acquiring conversion information in which a conversion rule is defined for converting first data acquired by performing a maintenance operation into second data processable by a facility maintenance management system; and
converting the first data in accordance with the conversion rule defined in the acquired conversion information to generate the second data,
wherein the converting of the first data comprises performing a first process of integrating or combining the first data in accordance with the conversion rule defined in the conversion information,
wherein the first data comprises first original data and second original data, types of the first original data and second original data being different from each other, and
wherein the converting of the first data comprises performing the first process of combining records in which a tag of the first original data and a tag of the second original data coincide with each other to generate combination data.

* * * * *